Sept. 27, 1949. C. H. SPARKLIN Re. 23,152

HOUSEHOLD VACUUM CLEANER HAVING AUTOMATIC NOZZLE ADJUSTMENT MEANS

Original Filed Dec. 21, 1935 4 Sheets-Sheet 1

Inventor:
Charles H. Sparklin,
By Dyrenforth, Lee, Christian & Wiles,
Attys.

Inventor:
Charles H. Sparklin,
By Dyrenforth, Lee, Christian & Miles,
Attys.

Sept. 27, 1949. C. H. SPARKLIN Re. 23,152
HOUSEHOLD VACUUM CLEANER HAVING AUTOMATIC NOZZLE ADJUSTMENT MEANS
Original Filed Dec. 21, 1935 4 Sheets-Sheet 3
Fig. 5.
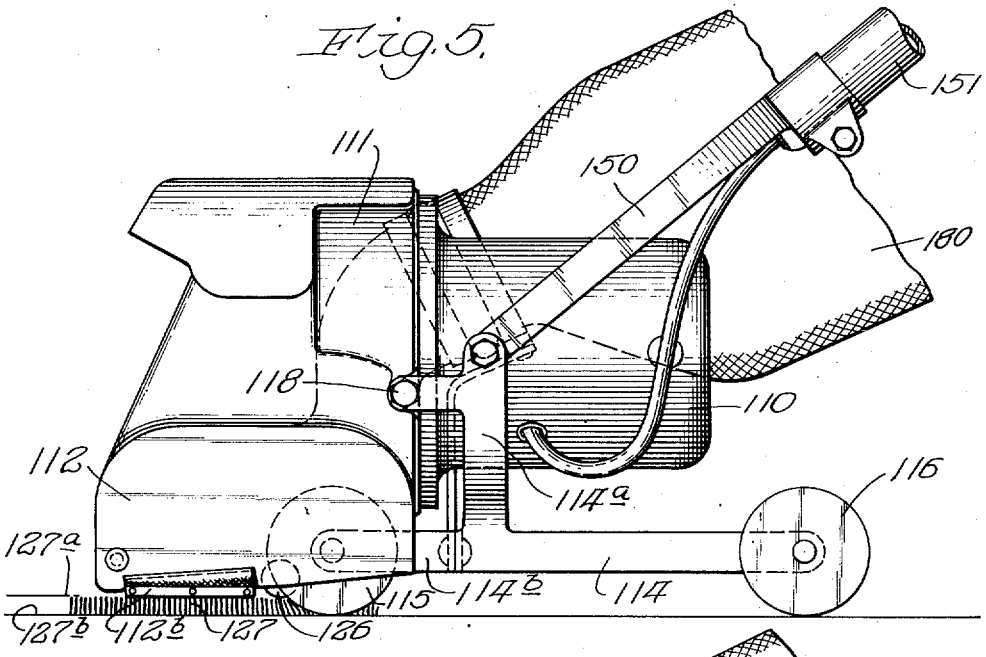
Fig. 7.
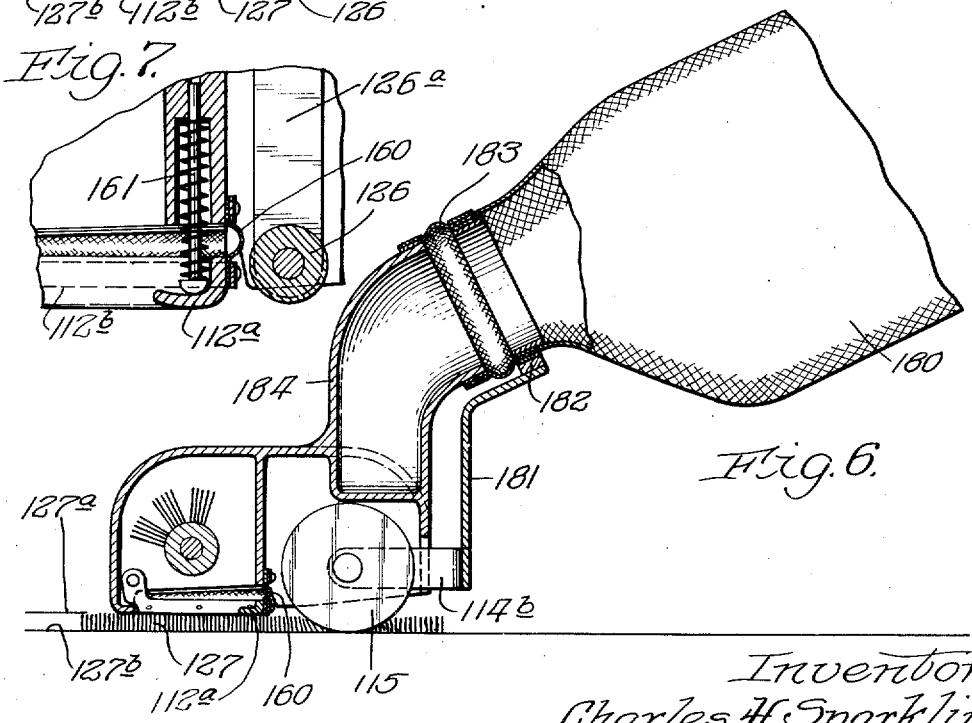
Fig. 6.
Inventor:
Charles H. Sparklin,
By Dyrenforth, Lee, Christy & Miles.
Attys.

Sept. 27, 1949. C. H. SPARKLIN Re. 23,152

HOUSEHOLD VACUUM CLEANER HAVING AUTOMATIC NOZZLE ADJUSTMENT MEANS

Original Filed Dec. 21, 1935 4 Sheets-Sheet 4

Inventor:
Charles H. Sparklin,
By Dyrenforth, Lee, Chritton & Miles,
Attys.

Reissued Sept. 27, 1949 Re. 23,152

UNITED STATES PATENT OFFICE 23,152

HOUSEHOLD VACUUM CLEANER HAVING AUTOMATIC NOZZLE ADJUSTMENT MEANS

Charles H. Sparklin, Chicago, Ill., assignor to Birtman Electric Company, Chicago, Ill., a corporation of Illinois Original No. 2,055,734, dated September 29, 1936, Serial No. 55,669, December 21, 1935. Application for reissue February 13, 1948, Serial No. 8,137

16 Claims. (Cl. 15—358)

Figure 1:
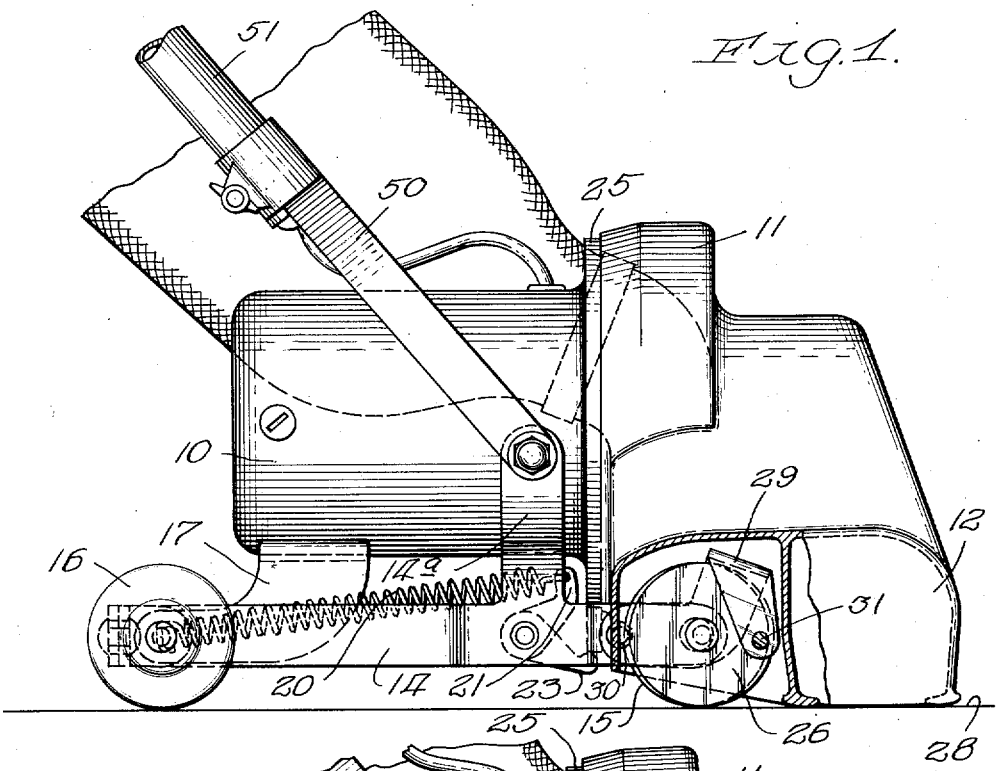

This invention relates to improvements in suction cleaners and, more especially, to cleaners of the portable type.

It is well known that suction cleaners of the type here under consideration are most generally used for cleaning rugs, carpets, and the like, although, of course, they are also used for cleaning bare hardwood floors, linoleum, and other surfaces. In connection with the cleaning of carpets, however, materials of varying thickness and softness are encountered; and, consequently, it has been found advisable to provide the cleaner with a vertically movable nozzle so that when operating on a carpet that is relatively thick and soft where the wheels sink in to a relatively great extent, the nozzle can be vertically adjusted upwardly so that in the cleaning of such carpet, the mouth of the nozzle will not be too close to the fabric or bear too hard thereon. Contrariwise, when operating upon a thin hard carpet or on a bare floor or linoleum, or the like, where the wheels do not sink into any perceptible extent, it has been found advisable to adjust the nozzle vertically downwardly so that it will be in proper position with respect to the surface being cleaned. Likewise, in operating upon carpets of this thickness, it has been found that vertical adjustment of the nozzle is necessary or desirable.

In general, it may be stated that I provide a carriage and a nozzle movable up and down with respect to the carriage. I also provide means acting substantially uniformly to substantially balance the forces of gravity acting on the nozzle throughout its range of movement which may be in a variety of forms, including any of those shown, for example, in Wiehle patent, No. 1,995,084, of March 19, 1935. The nozzles shown in that patent are vertically movable or adjustable with respect to the surface being cleaned; but as there shown, the nozzle is adapted to be drawn down against the surface undergoing cleaning under the influence of suction. The principal feature of the present invention is to provide additional supporting means for the nozzle or means limiting the downward movement of the nozzle operative especially when the cleaner is in operation. If a nozzle is counterbalanced but free to be drawn down against the surface being cleaned under the full influence of the suction, there may be undesirable friction between the nozzle and the material being cleaned, especially when operating upon soft thick fluffy carpets. That is, the suction may cause the nozzle to dig into the material to such an extent as to cause objectionable friction or opposition to movement of the cleaner. To overcome this, I provide, as stated above, additional supporting means or means limiting the downward movement of the nozzle when the cleaner is operating, said means including a member separate from the nozzle and preferably in the form of one or more rollers adapted to float or ride substantially on the surface of the material being cleaned. The supporting wheels for the carriage may be of the ordinary type or they may preferably be somewhat narrower than customary so that they will sink into the material being cleaned to a considerable extent below its surface, depending upon the nature of the material itself. With this construction, the nozzle will automatically be adjusted to the correct height, depending upon the kind, nature, softness and thickness of the material being cleaned and yet will not be drawn down against or into the material by the suction to an objectionable extent.

In describing the invention, I may use the word "carpet" to indicate any surface being cleaned. The invention is particularly valuable when a cleaner is used on carpets of varying degrees of thickness and softness and, consequently, in illustrating the invention, this word may be used.

The roller or rollers used for supporting or limiting downward movement of the nozzle may be described in general as nozzle-supporting means. It is to be understood, however, that the nozzle is really carried or supported by the carriage. That is, the nozzle and the motor casing with the motor inside are formed as a unit as is customary in connection with portable suction cleaners and the entire unit is carried by the carriage. The mounting on the carriage, however, is such that the nozzle itself is vertically adjustable with respect to the carriage and, consequently, with respect to the surface being cleaned. The nozzle-supporting means, therefore, in the form of the roller described above acts to limit downward movement of the nozzle, particularly under suction. This support for the nozzle is obtained by the roller floating or rolling substantially on the surface of the carpet. That is, it will sink into the carpet only to a very small extent, if at all; and not nearly as much into soft carpet as the wheels that support the carriage. Being in the form of a roller, it will slide easily over the surface of the carpet and thus lessen the friction. The roller preferably has considerable width, thus giving at least a line contact of considerable length and in all probability a surface contact of considerable area, thus preventing the roller from sinking into the surface of even soft thick carpets to any great extent. By "surface" is meant the very top of the carpet. It is contemplated that the roller will rest substantially on the upper ends of the threads forming the pile of a thick carpet without bending them over or crushing them down to any considerable extent.

It is realized, of course, that even with a wide roller, the same will sink into a soft carpet to some extent and, therefore, I have also provided a connection between the supporting roller and the nozzle whereby the movement of the latter is amplified with respect to that of the former. That is, even if the roller sinks into a thick carpet to some extent, the nozzle will be held a little bit higher than the roller so that it will always have the proper adjustment.

It has been found that when a nozzle is balanced, as described above, forward or backward acceleration of the cleaner negative or positive may cause some undesirable rocking of the nozzle. To prevent this I have, in one form of the invention, shown the nozzle as counterbalanced by pivoting the entire nozzle motor unit on the carriage and have placed this pivot at the center of inertia in a vertical plane.

I have also preferred to counterbalance the nozzle so that it will normally rock forwardly to a slight extent. This will insure proper cleaning action at all times.

Another feature of the invention is the provision of a separate support for the bag with a flexible connection between the bag and the nozzle so that the varying weight of the bag as it is filled with dirt will not unduly affect the nozzle-adjusting means.

Another feature of the invention is the provision of compensated springs so that their counterbalancing or counteracting effect on the nozzle will be substantially uniform for all positions of the nozzle.

Other features and advantages of my invention will appear more fully as I proceed with my specification.

In those forms of device embodying the features of my invention shown in the accompanying drawings—

Figure 2:
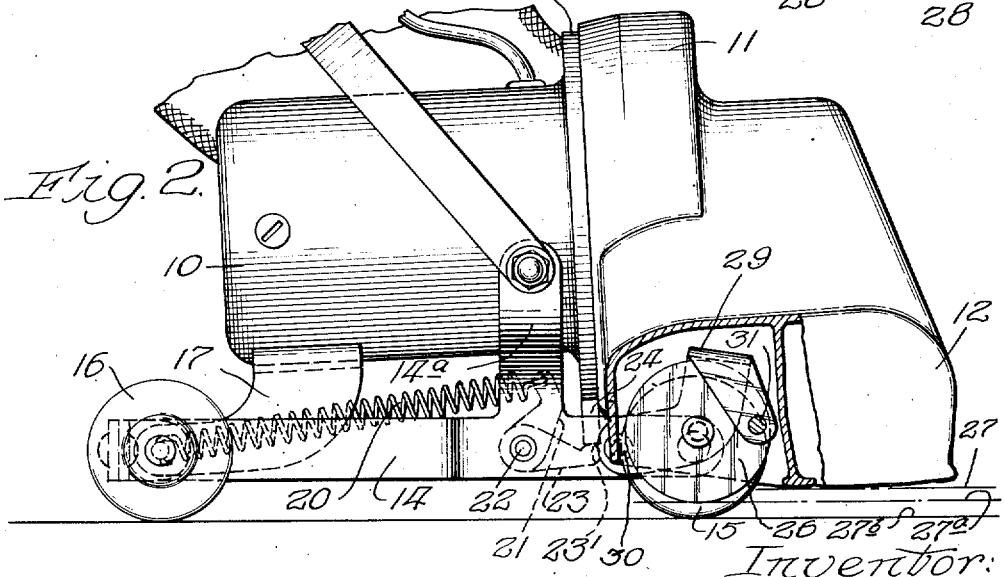
Figure 3:
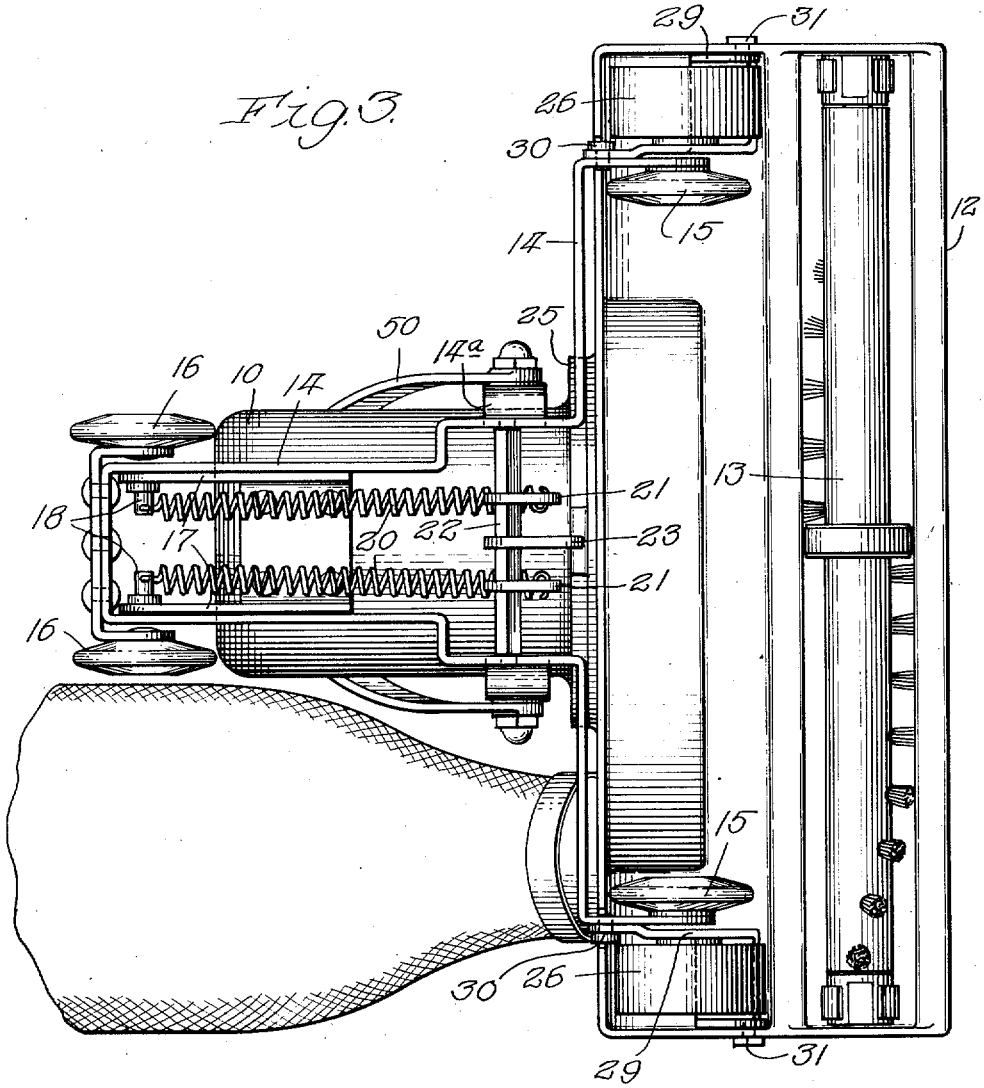
Figure 4:
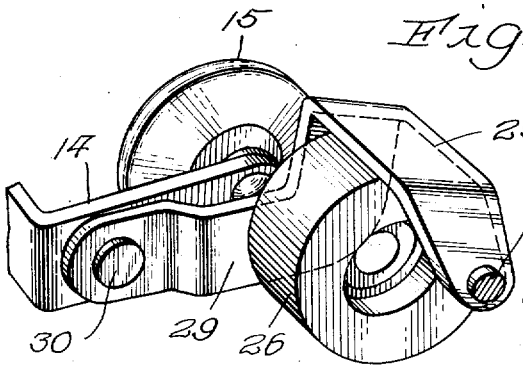
Figure 8:
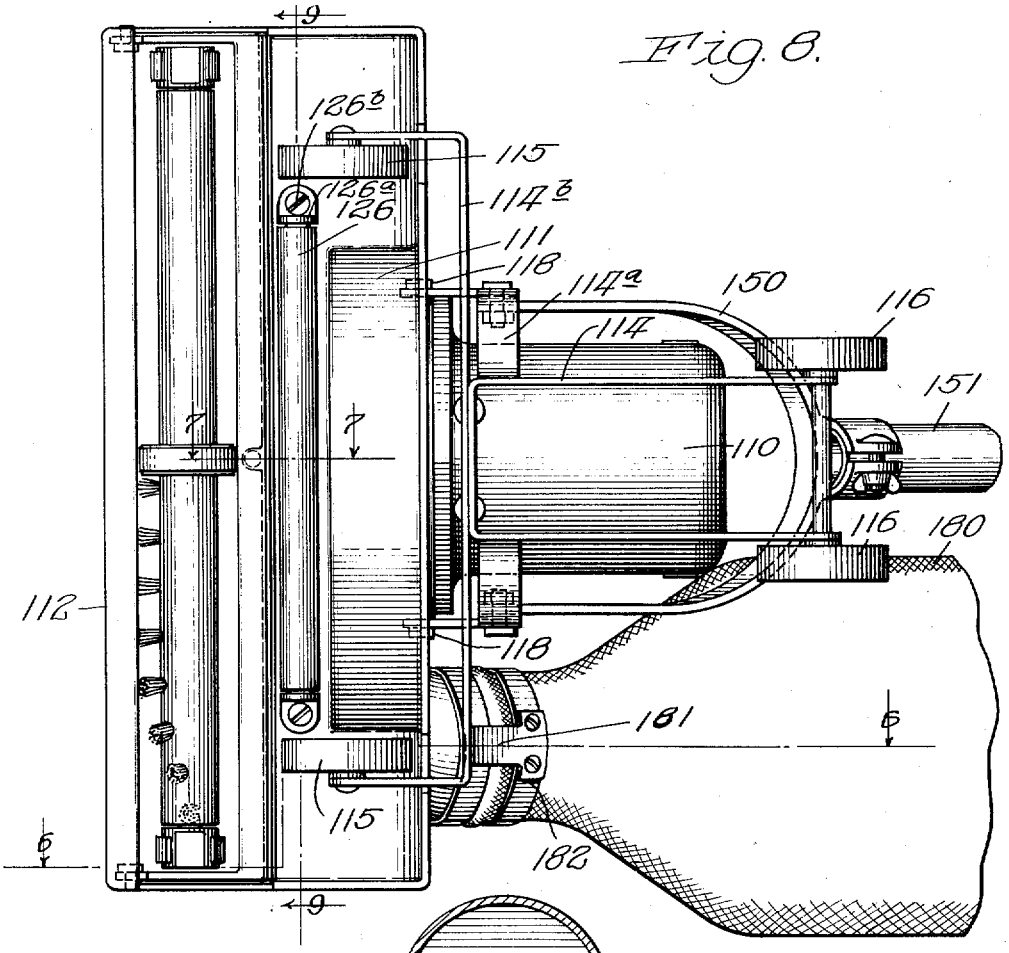
Figure 9:
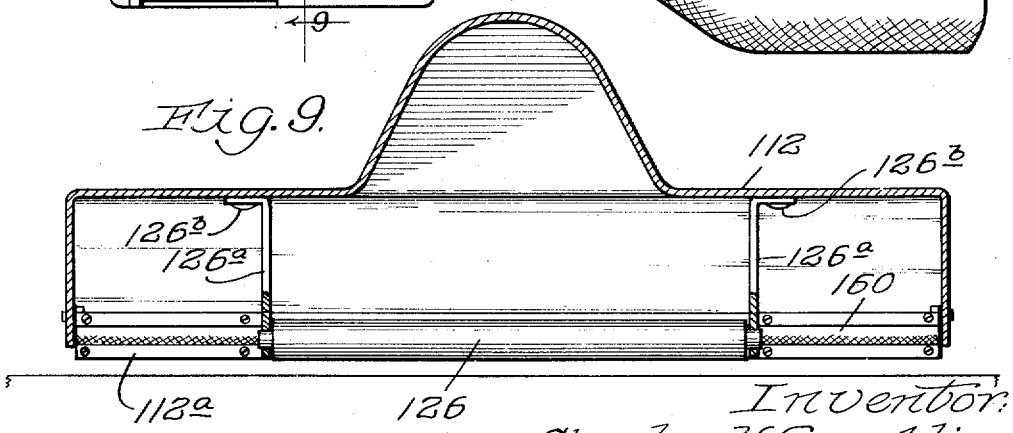

Figure 1 is a side elevation, partly in section; Fig. 2 is a similar view showing the nozzle in a different position; Fig. 3 is a bottom view of the same; Fig. 4 is a view in perspective of one of the rollers used for supporting the nozzle; Fig. 5 is a view in side elevation of a modified form; Fig. 6 is a view taken as indicated by the line 6—6 of Fig. 8; Fig. 7 is a view taken as indicated by the line 7—7 of Fig. 8; Fig. 8 is a bottom plan view of the cleaner of Fig. 5; and Fig. 9 is a view taken as indicated by the line 9—9 of Fig. 8.

*The device of Figs. 1, 2, 3 and 4*

In this device, 10 indicates a horizontal motor casing, 11 the usual fan casing, 12 the nozzle, and 13 a motor driven brush in the nozzle. The motor casing, fan casing and nozzle are made in a unit.

14 indicates a carriage or chassis supported on the two front wheels 15, 15 and the two rear wheels 16, 16. The carriage or chassis 14 as here shown is preferably formed principally of a metal bar or strap bent substantially into T-shape with the wheels 15, 15 carried at the forward ends and the wheels 16, 16 carried at the rear end. About midway of the carriage the same is provided with upstanding bars 14a to the upper ends of which are pivotally attached the lower ends of the bail 50 carrying the handle 51.

The nozzle 12 is vertically adjustable with respect to the surface being cleaned. In the device of Figs. 1 to 4, this is accomplished by pivotally supporting the unit including the motor casing, fan casing and nozzle at the rear end of the carriage. This pivotal connection permits the nozzle at the forward end of the cleaner to be moved upwardly or downwardly. As here shown, the support is accomplished by attaching the arms 17, 17 to the rear end of the motor casing 10 and pivoting their lower ends to the rear end of the carriage 14 on the pivots 18.

In order to substantially balance or counterbalance the forces of gravity acting on the nozzle throughout its range of movement, I provide the springs 20, 20, having their rear ends attached to the ends of the pivot 18 and and their forward ends attached to upstanding levels 21 on the rock shaft 22. 23 indicates a lever connected to the rock shaft with its forward end 23' bearing against a member 24 under the lower part of the flange 25 of the motor casing 10. The springs 20 pulling on the levers 21 rock the shaft 22 to lift the end of the lever 23 to support the member 24 and thus give support to the nozzle 12. The springs 20 are so selected so they will substantially balance the weight of the nozzle. That is, the nozzle will substantially float or be free to be moved upwardly or downwardly, although I preferably make the springs weak enough so that the nozzle normally will rock forwardly or downwardly to the limit of its movement. It is to be noted particularly that the levers 21 are inclined somewhat forwardly of the vertical so that as the nozzle moves downwardly and the spring tension is increased, the torque leverage of the levers 21 on the shaft 22 will be reduced owing to the increased parallelism between the levers 21 and the springs 20. The parts are so proportioned that this decreased leverage will substantially offset the increased pull of the springs so that they will exert a substantially "straight line" pull on the nozzle. That is, the springs will substantially uniformly balance the forces of gravity acting on the nozzle substantially throughout its entire range of movement.

The nozzle support includes the two rollers 26, 26. These rollers are wide enough so that they will ride more or less on the surface of thick carpet and, consequently, elevate the nozzle. For example, as shown in Fig. 2, the surface being cleaned is indicated as a rather thick carpet. The topmost surface of this carpet is indicated by 27. As here shown, the rollers 26 have sunk down into the carpet to some extent, that is, to the level of the line indicated by 27a, but they have not sunk down as low as the wheels 15 which are at the level of the line 27b which may be very near the bottom surface of the thick carpet. The cleaner is shown in Fig. 1 as operating upon a hard floor 28 and here the rollers 26 naturally rest at the same level as the wheels 15 and it will be seen that the nozzle consequently is also lowered.

The support of the nozzle on the rollers 26 is effected in the following manner. Links 29 are provided with their rear ends pivoted at 30 to the carriage 14. The front ends of the links 29 extend forwardly somewhat of the wheels 26 and support the nozzle 12 by the pivots 31. It will be seen that by this construction, the upward and downward movement of the rollers 26 with respect to the wheels 15 will be amplified when transmitted to the nozzle. This action is clearly illustrated in Figs. 1 and 2 where it will be seen that if the rollers are raised to the line 27ᵃ, the nozzle will be raised somewhat higher to the line 27. The parts are so proportioned that the nozzle will be held substantially at the desired height for varying thickness of carpet.

*The device of Figs. 5, 6, 7, 8 and 9*

In the device here shown, 110 indicates the motor casing, 111 the fan casing, and 112 the nozzle, these parts again being formed into a single unit.

The carriage is indicated by 114 and resembles, in general, the carriage of the other device. This carriage is likewise supported on the two forward wheels 115 and the two rear wheels 116. The carriage 114 is also provided with the upstanding arms 114ᵃ to which the ends of the bail 150 are attached. The bail carries a handle 151.

In order to counterbalance the nozzle 112 in this form, the unit, consisting of the nozzle, fan casing and motor casing, is pivoted at 118. This pivotal attachment at the points 118 is substantially in the horizontal plane of the center of percussion. This construction prevents or lessens rocking of the unit that otherwise might be caused by backward or forward acceleration of the cleaner negative or positive. The pivot points 118 are also so located that the weight of the motor and motor casing 110 back of the pivots substantially counterbalance the weight of the nozzle 112 and other parts of the unit located forward of the pivots. Preferably the pivots are slightly back of the center of gravity so the nozzle will normally rock forwardly or downwardly. It is to be understood, however, that the pivots 118 are so located that the weight of the unit back of the pivot substantially balances the forces of gravity acting on the nozzle throughout its range of movement.

In this form of device, to support the nozzle I provide the long roller 126 located slightly back of the nozzle and carriage in the bearing members 126ᵃ attached to the nozzle at 126ᵇ. The roller 126 is made very wide so that there will be provided a long line contact at least and probably a surface contact of considerable area on the top of a thick soft carpet so that the nozzle will be held considerably above the level of the wheels 115. In Figs. 5 and 6 I have indicated the cleaner operating upon rather thick carpet 127 and it will be seen that the roller 126 is supported substantially on the upper surface 127ᵃ of this carpet, whereas the wheels 115 sink down considerably into the carpet to the level of the line 127ᵇ. When operating on such a carpet, therefore, the nozzle 112 will be held by the rollers 126 close to the upper surface of the carpet to give the desired cleaning action.

Since the angularity of the nozzle 112 is changed slightly because of the location of the pivots 118 back of the nozzle, as here shown I provide the nozzle with an adjustable or floating rear lip 112ᵃ. This lip is connected to the main part of the nozzle by flexible cloth 160. Spring-pressed plungers 161 are employed to hold the lip 112ᵃ downwardly with slight pressure. The rear lip is provided with side lips 112ᵇ. By this construction, the lower lip surfaces will be substantially in a horizontal plane, regardless of the height of the nozzle.

In the construction here shown, I also provide means for supporting the bag 180 of the cleaner directly from the carriage so that its varying weight due to accumulations of dirt therein will not affect the counterbalancing of the nozzle. To this end, I provide the carriage with an upwardly extending post 181 carrying the ring 182 to which the lower end of the bag is attached. 183 indicates a flexible connection between the bag and the pipe 184 leading to the fan chamber.

The general principle embodied in both constructions may be considered as a lifting or upwardly urging of the nozzle by the weight or downward movement of the carriage. For example, as shown in Fig. 4, when the carriage 14 moves downwardly, it bears down on the rear end of the lever 29 which fulcrums on the axis of the roller 26. This lifts up the point 31, thus urging the nozzle upwardly.

I wish to state further in connection with the floating lip 112ᵃ that the purpose of this lip is not only to hold the lip surfaces in a horizontal plane, but also to prevent the rear lip from exterting too much friction on the carpet. It will be noted that since this rear lip is such a short distance from the pivotal axis of the roller 126 that if the force of suction is balanced at the center of the nozzle opening by upward force on this rear lip, this force may be excessive. As the nozzle moves upwardly, this rear lip may bury into the carpet as it is rising slower than the front lip. Hence, it is preferable to make it so that it will yield, thereby minimizing the frictional contact with the carpet. Furthermore, if this rear lip were not made to yield, it might render somewht ineffective the operation of the long roller 126 which is so close to it by striking the rug before the roller had sunk enough to have sufficient buoyancy to lift the nozzle without undue friction.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A household type suction cleaner for cleaning rugs and carpets and the like comprising a carriage including at least two wheels located at the rear thereof, an electric motor carried on said carriage, a nozzle mounted on the front of the carriage having a transverse open mouth, said nozzle being of a shape and size to position a rotary brush operatively connected to said motor and mounted within said mouth parallel with the floor and transverse to the carriage, said nozzle being vertically movable with respect to said carriage, and means for supporting the nozzle with said brush in position for contact with the material being cleaned through said open mouth of the nozzle, said supporting means including a member having a relatively large supporting surface relative to the weight supported thereby in order to ride substantially but not wholly on the surface of the material being cleaned regardless of the character of said material, said supporting member being located between said carriage wheels and the nozzle and amplifying vertical movement of the nozzle with respect to vertical movement of said supporting member relative to said wheels, and said carriage wheels being relatively small compared to the weight supported thereby, whereby they sink comparatively far into the carpet as compared to the supporting means.

2. A cleaner as set forth in claim 1 in which the supporting member includes at least one elongated roller in the rear of the nozzle and having the longitudinal axis of the roller substantially parallel with said brush.

3. A household type suction cleaner for cleaning rugs and carpets and the like, including: a carriage; a unit motor casing, fan casing, and nozzle pivotally mounted on the carriage whereby the nozzle is vertically movable with respect to the carriage; means substantially counterbalancing the weight of the nozzle; and means for supporting the nozzle, said means including a member having a relatively wide supporting surface adapted to ride substantially on the surface of the materia being cleaned regardless of its character.

4. A household type suction cleaner for cleaning rugs and carpets and the like, including: a carriage; a nozzle mounted on the carriage and vertically movable with respect to the carriage; and means for supporting the nozzle, said means including a member having a relatively wide supporting surface adapted to ride substantially on the surface of the material being cleaned regardless of its character, the mounting of the nozzle on the carriage being of such a character that the supporting means for the nozzle will automatically adjust its vertical height with respect to the carriage in accordance with the character of the material being cleaned said nozzle being provided with a floating rear lip, there being a flexible connection between said lip and the nozzle proper.

5. A household type suction cleaner for cleaning rugs and carpets and the like, including: a carriage; a nozzle mounted on the carriage and vertically movable with respect to the carriage; means for supporting the nozzle, said means including a member having a relatively wide supporting surface adapted to ride substantially on ahe surface of the material being cleaned regardless of its character, the mounting of the nozzle on the carriage being of such a character that the supporting means for the nozzle will automatically adjust its vertical height with respect to the carriage in accordance with the character of the material being cleaned; and a bag supported directly by the carriage with a flexible connection between said bag and the nozzle.

6. A cleaner as claimed in claim 3, in which the means for counterbalancing the nozzle includes a spring with a compensating connection including a lever means between the spring and the nozzle whereby the counterbalancing effect of the spring on the nozzle will be substantially uniform throughout the entire range of movement of the nozzle.

7. A household type suction cleaner for cleaning rugs and carpets and the like, including: a carriage; and a unit motor casing, fan casing, and nozzle, pivotally mounted on the carriage whereby the nozzle is vertically movable with respect to the carriage and substantially counterbalanced, the pivotal axis of said pivotal mounting lying substantially in the horizontal plane of the center of percussion of said unit.

8. A household type suction cleaner for cleaning rugs and carpets and the like, including: a carriage; a nozzle mounted on the carriage and vertically movable with respect to the carriage; means substantially counterbalancing the weight of the nozzle; and means for supporting the nozzle, including a member having a relatively wide supporting surface adapted to ride substantially on the surface of the material being cleaned regardless of its character, and a link with its forward end connected to the nozzle, its rear end connected to the carriage and said riding member attached to said link between its ends.

9. A household type suction cleaner for cleaning rugs and carpets and the like, including: a carriage; a nozzle mounted on the carriage and vertically movable with respect to the carriage; means substantially counterbalancing the weight of the nozzle; and means for supporting the nozzle, said means including a member having a relatively wide supporting surface adapted to ride substantially on the surface of the material being cleaned regardless of its character.

10. A suction cleaner as claimed in claim 3 in which the means for counterbalancing the nozzle includes a spring.

11. A suction cleaner as claimed in claim 3 in which the nozzle is substantially counterbalanced by substantially balancing the unit motor casing, fan casing, and nozzle on its pivotal mounting.

12. A household type suction cleaner for cleaning rugs and carpets and the like, including: a carriage; a unit fan casing and nozzle pivotally mounted on the carriage whereby the nozzle is vertically movable with respect to the carriage; means substantially counterbalancing the weight of the nozzle; and means for supporting the nozzle, said means including a member having a relatively wide supporting surface adapted to ride substantially on the surface of the material being cleaned regardless of its character.

13. A suction cleaner as claimed in claim 12 in which the means for counterbalancing the nozzle includes a motor casing.

14. A suction cleaner as claimed in claim 12 in which means for counterbalancing the nozzle includes a spring.

15. A household type suction cleaner for cleaning rugs and carpets and the like, including: a carriage; a unit motor casing, fan casing, and nozzle pivotally mounted on the carriage whereby the nozzle is vertically movable with respect to the carriage, said nozzle being provided with a floating rear lip and there being a flexible connection between said lip and the nozzle proper; means substantially counterbalancing the weight of the nozzle; and means for supporting the nozzle, said means including a member having a relatively wide supporting surface adapted to ride substantially on the surface of the material being cleaned regardless of its character.

16. A household type suction cleaner for cleaning rugs and carpets and the like, including: a carriage; a unit motor casing, fan casing, and nozzle pivotally mounted on the carriage whereby the nozzle is vertically movable with respect to the carriage, means substantially counterbalancing the weight of the nozzle; means for supporting the nozzle, said means including a member having a relatively wide supporting surface adapted to ride substantially on the surface of the material being cleaned regardless of its character, and a bag supported directly by the carriage with a flexible connection between said bag and the nozzle.

CHARLES H. SPARKLIN.

(References on following page)

REFERENCES CITED

The following references are of record in the file of this patent:

UNITED STATES PATENTS

| Number | Name | Date |
|---|---|---|
| Re. 15,423 | Orr | July 25, 1922 |
| 892,260 | Huber | June 30, 1908 |
| 1,092,823 | Chapman | Apr. 14, 1914 |
| 1,145,129 | Emerson | July 6, 1915 |
| 1,199,443 | Van Der Putten | Sept. 26, 1916 |
| 1,265,789 | Kirby | May 14, 1918 |
| 1,409,910 | Anderson | Mar. 21, 1922 |
| 1,527,377 | Orr | Feb. 24, 1925 |

| Number | Name | Date |
|---|---|---|
| 1,621,919 | Bain | Mar. 22, 1927 |
| 1,884,012 | Losey | Oct. 25, 1932 |
| 1,925,354 | White | Sept. 5, 1933 |
| 1,960,063 | Pardee | May 22, 1934 |
| 1,976,998 | Kirby | Oct. 16, 1934 |
| 1,995,084 | Wiehle | Mar. 19, 1935 |
| 2,027,938 | Taylor | Jan. 14, 1936 |
| 2,028,090 | Frantz | Jan. 14, 1936 |

FOREIGN PATENTS

| Number | Country | Date |
|---|---|---|
| 396,330 | Great Britain | Aug. 3, 1933 |